United States Patent [19]

Cason et al.

[11] 4,435,778
[45] Mar. 6, 1984

[54] METHOD FOR EDITING SPATIALLY RELATED DATA IN AN INTERACTIVE TEXT PROCESSING SYSTEM

[75] Inventors: William C. Cason; Rex A. McCaskill, both of Austin; Francisco A. Karner, Round Rock, all of Tex.

[73] Assignee: International Business Machines Corporation, Armonk, N.Y.

[21] Appl. No.: 264,368

[22] Filed: May 18, 1981

[51] Int. Cl.³ .............................................. G06F 3/153
[52] U.S. Cl. ..................................... 364/900; 340/709
[58] Field of Search ... 364/200 MS File, 900 MS File, 364/300; 340/750, 798, 799, 804

[56] References Cited

U.S. PATENT DOCUMENTS

| 3,501,746 | 3/1970 | Vosbury | 364/900 |
| 3,534,338 | 10/1970 | Christensen | 364/200 |
| 3,597,759 | 8/1971 | Hause | 340/799 X |
| 3,955,189 | 5/1976 | Thomson | 340/799 X |
| 4,118,695 | 10/1978 | Ogawa | 178/30 X |
| 4,149,145 | 4/1979 | Hartke | 340/750 X |
| 4,240,075 | 12/1980 | Bringol | 340/798 |

Primary Examiner—Edward J. Wise
Attorney, Agent, or Firm—Richard E. Cummins

[57] ABSTRACT

An improved text processing method is disclosed which permits spatially related data to be displayed and edited by the same method employed to display and edit conventional text type data in an interactive text processing system which includes a keyboard, a display device, and a microprocessor.

8 Claims, 8 Drawing Figures

|  | Keystroke Number | Key Operated | Display Character Space | Memory Add |
|---|---|---|---|---|
| Row 1 | 1 | ¶ Indent | 0 to 15 | 0 |
|  | 2 | P | 16 | 1 |
|  | 3 | A | 17 | 2 |
|  | 4 | T | 18 | 3 |
|  | 5 | . | 19 | 4 |
|  | 6 | Space | 20 | 5 |
|  | 7 | N | 21 | 6 |
|  | 8 | O | 22 | 7 |
|  | 9 | . | 23 | 8 |
|  | 10 | Space | 24 | 9 |
|  | ≈ | ≈ | ≈ | ≈ |
|  | 16 | Space | 30 | 15 |
|  | 17 | S | 31 | 16 |
|  | 18 | E | 32 | 17 |
|  | 19 | R | 33 | 18 |
|  | 20 | I | 34 | 19 |
|  | 21 | A | 35 | 20 |
|  | 22 | L | 36 | 21 |
|  | 23 | Space | 37 | 22 |
|  | 24 | N | 38 | 23 |
|  | 25 | O | 39 | 24 |
|  | 26 | . | 40 | 25 |
|  | 27 | Space | 41 | 26 |
|  | 28 | Space | 42 | 27 |
|  | ≈ | ≈ | ≈ | ≈ |
|  | 42 | D | 76 | 40 |
|  | 43 | A | 77 | 41 |
|  | 44 | T | 78 | 42 |
|  | 45 | E | 79 | 43 |
|  | 46 | ZICR (No line feed) |  | 44 |
| Row 2 | 1 | ¶ Indent | 0 to 15 | 100 |
|  | 2 | Underscore | 16 | 101 |
|  | ≈ | ≈ | ≈ | ≈ |
|  | 9 | Underscore | 23 | 108 |
|  | 10 | Space | 24 | 109 |

FIG. 5

FILE ATTRIBUTE TABLE

DISKETTE NAME = 01

FILE NAME = PATENT

| COL. # | NAME | MAX. WIDTH | DISPLAYED WIDTH | TYPE |
|---|---|---|---|---|
| 0 | REC. ID | 8 | 6 | 0 |
| 1 | PAT. NO. | 12 | 9 | 0 |
| 2 | SERIAL NO. | 12 | 10 | 0 |
| 3 | ISSUE DATE | 10 | 10 | 0 |

COMPRESSED VECTOR STORAGE FORMAT

| BYTE DESIGNATION | DEFINITION |
|---|---|
| L | NUMBER OF CHARACTERS IN ROW |
| L | INCLUDING LL |
| --- | --- |
| $\ell$ | NUMBER OF CHARACTERS IN |
| $\ell$ | COLUMN 1 INCLUDING $\ell\ell$ |
| d0 | ACTUAL DATA CHARACTER |
| d1 | |
| ≈ | |
| dn | |
| --- | --- |
| $\ell$ | NUMBER OF CHARACTERS IN COL. 2 |
| $\ell$ | INCLUDING $\ell\ell$ = 2 IF NO DATA |
| $\ell$ | NO. OF CHARACTERS IN COL. 3 |
| $\ell$ | INCLUDING $\ell\ell$ |
| | ETC. |

FIG. 8

METHOD FOR EDITING SPATIALLY RELATED DATA IN AN INTERACTIVE TEXT PROCESSING SYSTEM

DESCRIPTION

1. Technical Field

This invention relates in general to interactive text processing systems which process both conventional text data and spatially related data that is stored in a vector format and, in particular, to an improved method for displaying and editing the spatially related data which involves converting a portion of the stored data from a vector format to the text format to permit one interactive process to display and edit both types of stored data.

2. Prior Art

A typical interactive text processing system currently operational in many office environments comprises a keyboard, a display, a printer, a diskette storage device and a microprocessor which has been programmed to cause interaction of the various system components to perform numerous text processing functions. One of the main functions of a text processing system is to create a document on the output printer which may, for example, be a single one-page letter or a multi-page manuscript. The interactive nature of these systems initially involves a query-response type mode of operation where the system displays the questions or available options to the operator and, perhaps, a number of responses. The operator then indicates the response by pressing a defined character key or by keying in the requested data. By such a procedure, the various parameters of a document format may be defined to the system. The system is then placed in the text entry mode so that actual text is keyed in by the operator and displayed on the screen in a format generally resembling that which would appear on the printed document.

It will be appreciated that the text is entered initially as a series of keystrokes, each of which is converted to a byte or character of data in the system that is subsequently stored in the memory of the microprocessor. Most keystrokes that are entered will represent characters of data and will be recognized as such by the microprocessor so that these will be transferred by the microprocessor to the display refresh buffer from which the characters will be displayed on the display screen. It will be recognized also that a limited number of keystrokes generate text format control data, such as a paragraph indent signal achieved by tabbing, or a carriage return signal. These text format bytes are recognized by the microprocessor which provides the required character control signals to the display refresh buffer. The other function of the microprocessor is to supply to the refresh buffer a cursor character signal which is displayed to the operator as an indication where the character representing the next keystroke will be displayed.

In many applications, after all the text has been entered, the operator requests a printed document from the system. The system then enters the printing mode and prints the document, employing the stored format parameters and the text. The document, as stored in memory, comprises a series of data and control characters and transferred to diskette storage either before or after the document has been printed. The name of the document and the diskette number is also added to the index of documents kept by the system. This permits the document record to be subsequently retrieved.

After the printed document has been edited by the author, the operator recalls the document from diskette storage into main memory and causes it to be displayed by the system, which is placed in an update mode. The operator may then position the cursor by operation of cursor move keys to a character position on the display which is to be modified, e.g., to a word to be deleted. The operator merely presses a delete key before moving the cursor through the characters of the word by the cursor control key, and the word is erased in storage by action of the microprocessor and will, therefore, not appear in the updated document.

Those familiar with the internal operation of text processing systems employing microprocessors understand the various detailed steps that the microprocessor takes in converting a simple keystroke into a character on the display screen and to a byte of binary data in a storage location in memory while "simultaneously" controlling the position of the cursor on the display screen to assist the operator to properly format the document.

In most text processing systems, the text data is merely stored sequentially in memory as the sequence of keystrokes occurred, i.e., character data interspersed by the appropriate control data such as paragraph indents, carriage returns, line advances, etc. In many systems, the document format parameters, such as page length, left and right margins, line spacing, type font, etc., are stored independently of the text data and, hence, the text format parameters of the final document can be entirely different than the parameters employed when the text was initially entered into the system.

Sequential keystroke information storage of text data does permit the implementation of a number of different editing functions which enhance the performance and desirability of text processing systems. These functions range from the simple revision feature, such as deleting, adding or changing characters or words, to more sophisticated features, such as checking the spelling of all words in the document against a defined list of words or automatically replacing a defined word with another word at every occurrence in the document.

Text processing systems of the type described above, however, do not have the capability of easily manipulating data that is spatially related, such as data which is arranged in a matrix of rows and columns. Where it is also desirable to process spatially related data in an interactive text processing system, the prior art systems employ an entirely different set of programs for processing spatially related data. One reason for the different set of programs is that there is an advantage in storing spatially related data in a vector format since this permits data processing type of functions, i.e., sorting of record fields or repositioning of fields, by the microprocessor quite easily. Hence, since the spatially related data is stored differently in the system than text data, the simple type of editing functions which must also be done on the spatially related data have required in the past their own set of programs stored with the microprocessor.

It has been found, in accordance with the present invention, that considerable storage space can be saved if the display and editing processes for text data can also be used for displaying and editing data stored in a vector format. The display and editing processes for text data in the present invention are also employed to display and edit the spatially related data by converting a predetermined amount of the vector stored data to text data. The display and editing processes then function as if the spatially related data was really text.

SUMMARY OF THE INVENTION

The present invention is directed to an improved method for a text processing system which permits spatially related data to be displayed and edited by the same process employed to display and edit conventional text type data.

In accordance with the present invention, spatially related data is first entered into the text processing system in a conventional query-response mode until all of the potential parameters of the spatial relationship of the data or coordinate system are stored. The system then displays the header portion of the matrix showing, for example, the name and width of each column. The system further positions the cursor at the starting position in the upper left corner, which can be defined as row 1, column 0, character position 0. Data is then entered into each column and is displayed as conventional text data, the cursor being appropriately positioned after each keystroke. The operator also has the capability of moving the cursor one character position at a time in accordance with normal text conventions. Internally, the captured keystrokes are stored in memory as conventional control characters and text data so text can be displayed in a conventional manner. The data of each row subsequently is encoded as a vector where the spatial relationship of the data in the matrix is defined, and the vector is stored for later use.

Subsequent modification of the vector is done either on the encoded vector, if the modification involves a change in the spatial relationship, or on the decoded vector, if the modification is to the actual data. An example of one modification which can be accomplished would be the relocation or repositioning in the matrix of rows in accordance with the data in one column, i.e., sorting and collating. Such operations in conventional text processing systems would be extremely cumbersome and time consuming, if not impossible. However, since all the data is identified spatially, it becomes a relatively simple matter for the microprocessor to identify the vector and to modify its spatial parameters in accordance with the desired changes.

If changes to the data per se are desired, the vector is merely decoded and the data displayed as conventional text. The data is then edited in a conventional text processing mode by the same process and programs employed to edit text data, thus avoiding the necessity of a completely new process to edit vector data. After editing, the data is again encoded as a vector for storage.

It is, therefore, an object of the present invention to provide an improved method for manipulating spatially related data in an interactive text processing system.

Another object of the present invention is to provide an improved method for displaying data that is spatially related in an interactive text processing system.

A further object of the present invention is to provide in an interactive text processing system one process by which an operator may edit displayed data regardless of whether the displayed data is conventional text or spatially related data.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 5 is a diagrammatic view of the text buffer shown in FIG. 3;

FIG. 8 shows the compressed vector format for storage of file data on the diskette;

DESCRIPTION OF THE INVENTION

The improved method of the present invention will be described as embodied in a conventional text processing system, represented by the functional block system diagram shown in FIGS. 1-4. The description will not involve the details of the conventional text processing system, other than the functional aspects of such a system necessary to an understanding of the present invention. The description likewise will not involve the hardware or program details of the microprocessor other than those aspects necessary to understand a programmed implementation of the improved method of a microprocessor.

Figure 1:
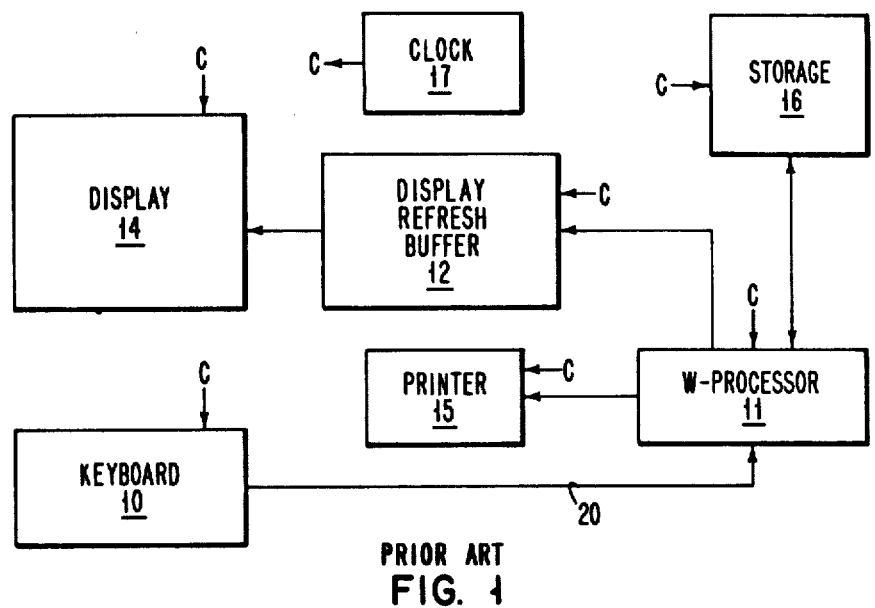
FIG. 1 is a block diagram of an interactive text processing system embodying the present invention.

With reference to the drawings, and particularly to FIG. 1, the text processing system illustrated therein comprises a keyboard 10, a microprocessor 11, a display refresh buffer 12, a display device 14, a printer 15, and an auxiliary diskette storage device 16. A clock 17, for keeping the various components of the system in synchronism, is also shown in FIG. 1 and is effectively coupled to each of the units.

Keyboard 10 comprises a normal set of graphic symbol keys such as letters, numbers, punctuation marks, and special character keys, plus text format or control keys like carriage return, indent, etc. In addition, the keyboard includes a second set of control keys for issuing special control commands to the system. The control keys include cursor movement keys, keys for setting the keyboard into a number of different modes, etc.

Figure 2:
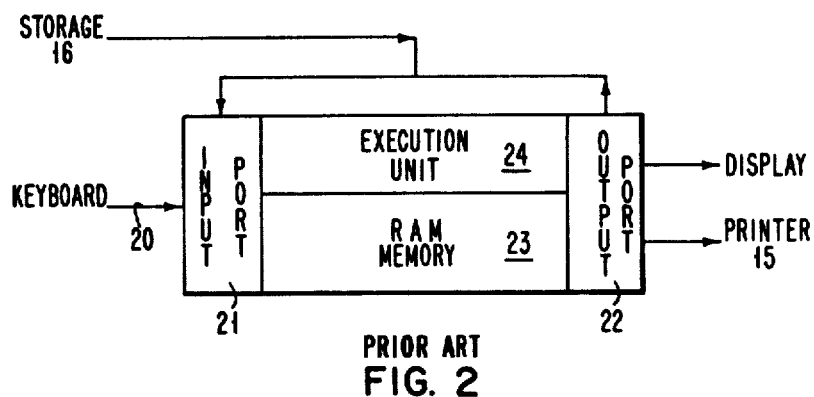
FIG. 2 is a functional diagram of the microprocessor shown in FIG. 1.

The keyboard is connected to the microprocessor by means of a bus 20. The microprocessor, as shown in FIG. 2, comprises an input port 21, an output port 22, a random access memory 23, and a process execution unit 24.

Figure 3:
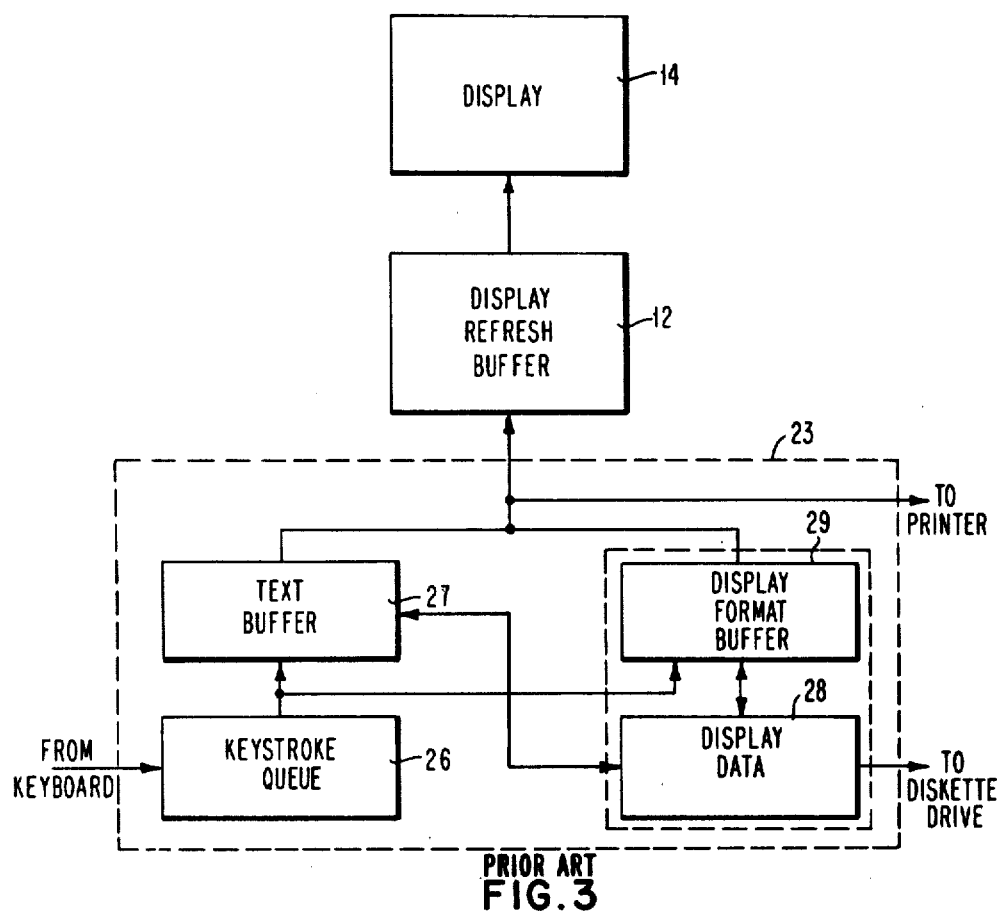
FIG. 3 is a functional diagram illustrating the data flow path between portions of the memory and the microprocessor and the display refresh buffer.

Functionally, memory unit 23 stores both instructions and data in specified sections which will be described in more detail later on in the specification. Data is entered into memory 23 from the keyboard as bytes of binary information through input port 21. As shown in FIG. 3, the section of RAM 23 which receives the keystroke data from the keyboard is designated keystroke queue 26. Data to be displayed is transferred by a series of instructions from queue 26 to the text buffer section 27 and then to the display refresh buffer 12 through output port 22 of the microprocessor. This is achieved in a conventional way by the microprocessor executing a series of move instructions.

The microprocessor 11 may be an INTEL model 8086 or any of the recognized functionally equivalent, currently available microprocessors.

The display refresh buffer 12 is shown as a separate buffer connected between the output port 22 and the display device 14. Buffer 12, in practice, is normally a part of the display device 14 and functions to control the generation of characters on the screen of the display device 14 by exercising on-off control of the beam as it traces a series of horizontal lines across the screen.

The output port, 22 also supplies data stored in memory 23 to the printer 15 and diskette storage unit 16, each of which may have their own internal buffers which are not shown. Commands to transfer data from the random access memory 23 to the printer 15 or storage unit 16 are sent to the microprocessor by the operator from the keyboard 10.

Printer 15 may be any suitable printer known in the art. In most text processing systems, the printer is basically a standard output terminal printer having a type ball element or a daisy-wheel print element.

Diskette storage 16 may also be any suitable disk storage device which is capable of storing serial by byte data supplied to it at determined sector address locations, each of which are randomly addressable by the microprocessor to retrieve the data. Spatially related data supplied to diskette drive 16 is stored in the display data area 28 of the memory 23 in encoded form. The other section of memory 23 shown in FIG. 3 is the display format buffer area 29 which is involved in the handling of spatially related data in decoded form in accordance with the method of the present invention.

Figure 4:
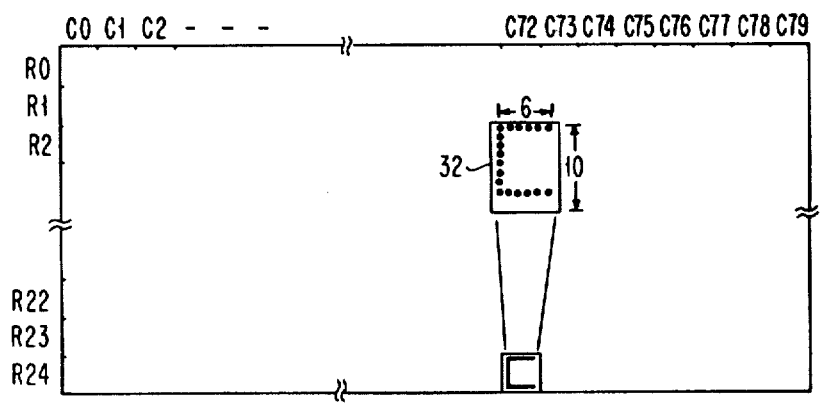
FIG. 4 is a diagrammatic view of the display shown in FIG. 1.

FIG. 4 is a schematic representation of the screen of display device 14. As shown in FIG. 4, the screen has, for example, the capability of displaying 25 lines of characters where each line consists of 80 character column positions. In practice, one character position consists of a matrix of dot positions or picture elements sometimes referred to as pels. A typical character matrix for a display of the type represented by device 14 would be a matrix of six wide by ten high pels, which has been designated by reference character 32 in FIG. 4. The interaction of the refresh buffer 12 and the display 14 is to convert the characters stored at a location in the buffer 12 to the corresponding character as formed in a 6×10 dot matrix at the equivalent location on the display 14. Display 14 generally is provided with its own set of electronics to achieve that conversion. The microprocessor 11 need only supply the address and load the buffer 12 with the appropriate characters.

The diskette storage device 16 also is generally provided with its own set of electronics for converting a byte of data supplied from the display data area 28 of memory 23 through the output port 22 to a serial by bit stream of data to be recorded at a predetermined sector of the one addressed concentric recording track on the diskette. Data from the device 16 is supplied to the microprocessor 11 serial by byte from the addressed sector and storage tracks when requested.

It will be understood that all of the above described functions and interactions involving the microprocessor are achieved through suitable programs which are also stored in memory 23 and which are called into operation in response to data from the keyboard 10 or interrupt signals generated by the various components of the system shown in FIG. 1.

FIG. 5 illustrates how spatially related data, such as a three-row, three-column matrix reproduced below, would appear in buffer 27 of FIG. 3 when entered as text data in the system shown in FIG. 1:

| Pat. No. | Serial No. | Issue Date |
|---|---|---|
| 3,911,418 | 380,002 | 05/26/79 |
| 4,001,779 | 400,980 | 07/28/81 |
| 3,859,664 | 221,550 | 09/11/78 |

A comparison of the above data to the characters shown in FIG. 5 illustrates a number of basic characteristics of storage of text type data. A storage location is needed for each separate character to be displayed which corresponds to a keystroke.

Generally, one keystroke will equate to one storage position, but there will be exceptions such as when one character is underlined or two conventional characters are employed to create a desired graphic, for example, a $\emptyset$ or a $\neq$. Similarly, white space is sometimes stored as a blank character, a tab code, or a control code, such as a carriage return at the end of the text.

In addition, the display of vertical bars (not shown above) for separation of displayed fields is desirable but requires considerable steps and time by the operator if entered in a conventional text mode.

By definition, text data is not spatially related in that the distance between the start of the data and its storage location is not significant, other than from an appearance and convention standpoint. Line lengths are not stored with the data and different line lengths are usually only discernible by carriage return symbols indicating the beginning of a new line.

As shown in FIG. 5, the data, while spatially related, has been entered and stored as text data without use of tab keys, which would have improved the storage efficiency to some degree. However, for purposes of explanation of the limitations of conventional text processing, now assume that the document has been drafted, which includes the above 3×3 matrix of data and that it is desired, after editing by the author, to add a fourth column (Filing Date) to the table and also interchange the position of the serial number column with the patent number column and sequence the list by serial number order, such that in the revised document the data might appear as follows:

| Ser.No. | Filing Date | Pat. No. | Issue Date |
|---|---|---|---|
| 221,550 | 05/03/77 | 3,859,664 | 09/11/78 |
| 380,002 | 09/15/77 | 3,911,418 | 05/26/79 |
| 400,980 | 06/12/78 | 4,001,779 | 07/28/81 |

It will be generally recognized by those persons familiar with text processing systems that all of the keystroke data which has been stored in memory, representing the initially entered data, is substantially worthless and that the operator, from an efficiency standpoint, would probably start and enter the data again in the order desired, rather than trying to use the stored information. If the table was large, such as 200 rows, the task might not even be contemplated.

However, the data may be manipulated by the microprocessor in the desired manner quite easily when the data is encoded as vectors corresponding to the spatial relationship of the data. In these systems, when the spatially related data is stored as vector data, editing operations unique to the stored formatted data are required, as contrasted with the use of one editing process for both types of data, as contemplated by the present invention.

In accordance with the present invention, the spatially related data is initially entered into an area of memory designated as the display format buffer, which is similar in function to the text storage buffer in that it supplies output data to the refresh buffer 12 for display. The format of the data stored in the display format buffer 29 of FIG. 3 is exactly the same as the format of the text data stored in the text storage buffer 27.

The display format buffer is contained within the section of memory referred to generally as the Horizontal Display Control Block (HDBC). The HDBC is fixed between address positions in memory and, in practice, may be approximately 6,000 storage positions of the memory. The display format buffer 29, on the other hand, is variable in size, and its beginning position is fixed at a point in memory near the beginning of the HDCB. The bottom section of the HDCB contains the display data area for storing the data in vector format. The end of the display data area is fixed, while the starting point varies as the length of the stored vectors. This permits a "free space" between the display format buffer and the display data area which is employed in modifying the data in either area, e.g., lengthening or shortening the data. As will be explained in detail later on in the specification, the entry of spatial data into the system is similar to the entry of text data except that the operator is presented with the header information on the screen. As a line of spatial data is entered, it is displayed to the operator from the display format buffer 29. However, at some subsequent time, the entered data is encoded in a vector format and stored in the display data area 28. The display format buffer 29, therefore, merely functions to provide to the display device some predetermined "slice" of all of the spatially related data stored in vector format in the display data area 28.

Figures 6, 7:
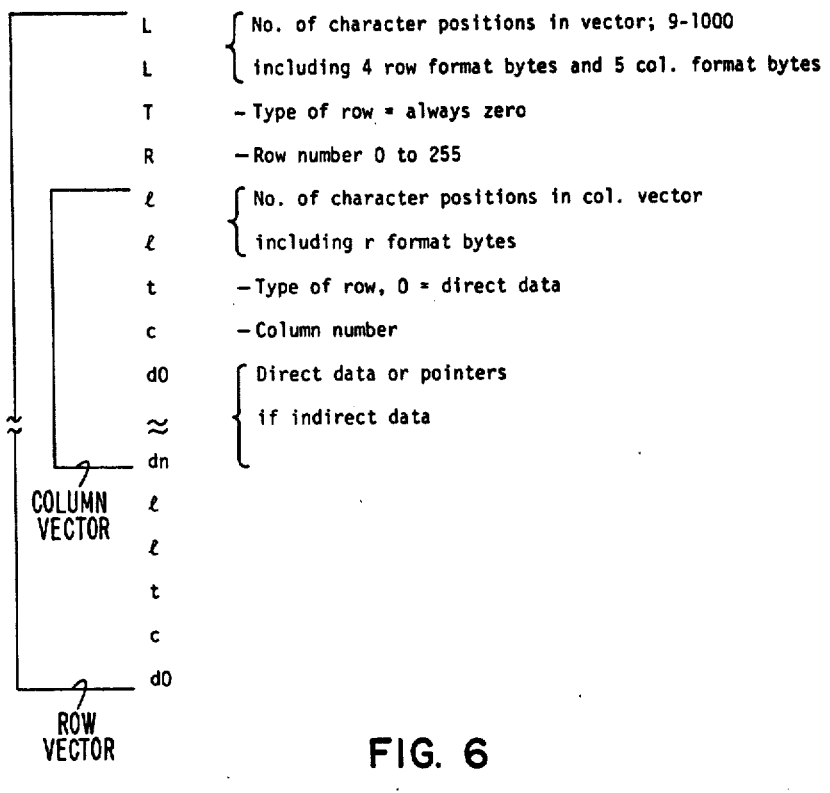
FIG. 6 shows the vector format for storage of file data in the display data area.
FIG. 7 represents the header table stored in memory.

FIG. 6 illustrates the vector format employed for storing the data in the display data area. Each line or row of the matrix comprises a row vector and a plurality of column vectors. The row vector comprises four bytes designated LLTR, respectively, where byte positions 0 and 1, i.e., LL, store the total number of bytes on the line (including the four bytes of the vector description), byte position 2, i.e., T, indicates the type of line and, in this example, will be considered always to be 0. Byte position 3, i.e., R, is the row number, which permits a table of 255 rows. The data in each column is also encoded as a vector having the format 11tc where 11 is two byte positions specifying the length of the data in number of characters which are in the column, including the four byte representation 11tc. "t" is a 1-byte designation of the type of data in the column which, in the present example, will be either 1 or 0. A zero indication signifies that the data portion of the vector is actual data. A one indication in the type byte indicates that the data portion of the vector is a 6-byte pointer, 4 bytes of which designate a location in memory where the data is stored, and the last two bytes indicate the length of that stored data. The last byte of the column vector, c, is the column number, thereby permitting a table having 255 columns.

At the point in the preparation of the document where the table is to be created, the operator notifies the system by placing the system in a query-response mode, where one option presented to the operator is to "Create a File." After selecting this option and assigning a name to the file, the system prompts the operator for defined parameters of the file by column or field, such as the name of the column or field, the type of data to be placed in the column, and the width of each column. The information entered by the operator is stored in memory as a table similar to that shown in FIG. 7. After all the parameters have been defined, the header data is displayed to the operator to assist in the entry of the records into the file.

In order to display the header data, a header vector is created from the table as shown in FIG. 7 and stored in the display data area. The header data is transferred to the display format buffer 29 in decoded form as conventional text stream data and then to the refresh buffer 12, from which it is displayed. The header row vector for the present example is reproduced below, where the first column represents the vector name, the second column the byte location or address in memory where the vector is stored, the third column the vector byte designation stored at that location, the fourth column the actual data character, and the last column comments relating to the byte of data stored at that location.

| 1 | 2 | 3 | 4 | 5 |
|---|---|---|---|---|
| VR0 | 0 | L | 4 | Number of |
|  | 1 | L | 4 | bytes in |
|  | 2 | T | Zero | row |
|  | 3 | R | Zero | Type |
|  |  |  |  | Row Number |
|  | 4 | 1 | 1 | Number of |
|  | 5 | 1 | 0 | bytes in |
|  | 6 | t | 1 | column VC0 |
|  | 7 | c | 0 | Type |
|  | 8 | P0 | X | Column |
|  | 9 | P1 | X | number |
|  | 10 | P2 | X | 4-byte |
|  | 11 | P3 | X | pointer to |
|  | 12 | P4 | Y | memory |
|  | 13 | P5 | Y | location |
|  |  |  |  | where title |
|  |  |  |  | is stored |
|  |  |  |  | 2-byte |
|  |  |  |  | pointer |
|  |  |  |  | for length |
| VC1 | 14 | 1 | 1 | Same |
|  | 15 | 1 | 0 | format |
|  | 16 | t | 1 |  |
|  | 17 | c | 1 |  |
|  | 18 | P0 | X |  |
|  | 19 | P1 | X |  |
|  | 20 | P2 | X |  |
|  | 21 | P3 | X |  |
|  | 22 | P4 | Y |  |
|  | 23 | P5 | Y |  |
| VC2 | 24 | 1 | 1 | Same |
|  | 25 | 1 | 0 | format |
|  | 26 | t | 1 |  |
|  | 27 | c | 2 |  |
|  | 28 | P0 | X |  |
|  | 29 | P1 | X |  |
|  | 30 | P2 | X |  |
|  | 31 | P3 | X |  |
|  | 32 | P4 | Y |  |
|  | 33 | P5 | Y |  |
| VC3 | 34 | 1 | 1 | Same |
|  | 35 | 1 | 0 | format |
|  | 36 | t | 1 |  |
|  | 37 | c | 3 |  |
|  | 38 | P0 | X |  |
|  | 39 | P1 | X |  |
|  | 40 | P2 | X |  |
|  | 41 | P3 | X |  |
|  | 42 | P4 | Y |  |
|  | 43 | P5 | Y |  |
| VR1 | 44 | L | 5 | Next |
|  | 45 | L | 8 | row |

As the data for row 1 is entered in the appropriate field by the operator, it is transferred to the display format buffer 29 before it is encoded, or it may be encoded column by column as it is entered. In the preferred embodiment of the present invention, the operator, after keying in the last character of the data for a column, moves the cursor to the first character position of the next column by depressing a specified cursor move key. The system recognizes this signal and encodes the data just entered for that column as a column vector at that time. The encoding process is, thus, done on a column by column basis in the preferred embodiment. In this regard, the data for the line length is accumulated at the end of encoding each column. The two bytes of data stored at LL, therefore, represent the running total of the number of byte positions involved in the columns encoded to that point in the encoding process. The encoding operation is achieved by programming the microprocessor to convert text to vector formatted data.

The number of row vectors normally maintained in the display data area of memory at any time is dependent on the size of the memory. The remaining portion of the file, e.g., the rows above and below the rows being displayed, is stored either in another section of memory or, preferably, on the diskette in a compressed vector format in which the vector portion only includes the field length, but does not include type or column number parameters. FIG. 8 illustrates the format for storing data on the diskette.

It will be appreciated by those persons familiar with the storage of text type data in interactive systems that to find a given line of text, each preceding line of text must be scanned, since the text data stream does not involve positional type data. Therefore, in most text systems, a number of lines are displayed, and they can generally be scrolled forward or backward by the operator until the desired line is found. To find one row of spatially related data, where the row may contain up to 100 columns or 1000 actual data byte positions, by scrolling vertically or horizontally would be very time consuming. However, this becomes unnecessary since each row vector LL indicates the beginning position of the next row and each column vector indicates the beginning position of the next column. Thus, if it is desired to display row 10, column 3, it is a relatively simple matter for the microprocessor to find the position in memory of the beginning of row 10. All that is required is to access the LL character positions for row 0 which is in the base position. The beginning of row 1 will be located at the position LL of row 0. Likewise, the beginning of row 2 will be at position in memory LL0+LL1 relative to the base. The microprocessor need only reference memory 9 times to find the 10th line, which is a rather trivial task compared to the searching required in a text data stream. Thus, it will be seen that the vector format, in addition to permitting a decrease in storage requirements relative to some text storage arrangements, provides a considerable improvement in response time when the operator desires to display a selected segment or row of spatially related data in order to check or edit that data.

As mentioned earlier, the system is arranged so that both conventional text data and spatially related data are edited by the same process which involves or comprises a prescribed set of operator interactions with the screen and the keyboard. The set of interactions will depend on the specific editing functions, i.e., "delete", "insert", "move", etc., and also on how that particular function has been implemented on the particular text processing system. In some prior art systems, for example, a "move" edit function involves a series of prompts which the operator responds to, while, in other prior art systems, the operator must indicate by cursor control keys controlling the movement of the cursor what is to be moved and to what destination. The term "prescribed set of operator interactions with the screen and keyboard" refers to the sequence of microsteps which occur involving either an action of a human operator followed by a corresponding reaction of a machine operations and vice versa for the edit function to be accomplished. Assume, for example, that after review by the author, the data in the 3-row by 3-column table entered earlier was to be changed so that it would appear as follows:

| Pat. No. | Ser. No | Issue Date |
|----------|---------|------------|
| 3911418  | S.N. 380,002 | 05-26-79 |
| 4001779  | S.N. 400,980 | 07-28-81 |
| 3859664  | S.N. 221,550 | 09-11-78 |

The differences in the tables are that the commas have been deleted in the patent numbers in column 1. In column 2, the letters "S.N." have been added prior to the six-digit number. In column 3, the "/" character separating the month, day and year digits has been changed to a "-" character.

In practice, the operator would place the machine in the document update mode, where the header and row 1 would be displayed. The data for row 1 which was stored in the diskette is brought into the display data area where the compact format is expanded to the vector format. The vector format is then decoded by the microprocessor to place conventional text data in the display format buffer, as previously explained. The various detailed steps which occur in editing row 1 are exactly the same steps the operator would follow if the display data was a line of text. For example, the operator would move the cursor to the character 9 following the comma between the "3" and the "9" digits and then key an error correct backspace which would erase from memory the comma.

In column 2, labelled "Serial No.", the 6-digit number is moved four spaces to the right automatically when the operator places the cursor on the first digit of the 6-digit number and keys S.N.

The substitution of the dash or hyphen character for the slash character in column 3 is achieved by positioning the cursor one character position to the right of the hyphen, hitting the error correct backspace key, and then entering the hyphen.

The data as edited (changed) in the display format buffer is again encoded as vector data and transferred to the display data area. From there, it is transferred back to the diskette in compact vector format, and another row of data is processed. Successive rows are then processed in a manner similar to that just described.

The following flow chart summarizes the operations of the system described above involving the process of editing conventional text type data and spatially related text type data.

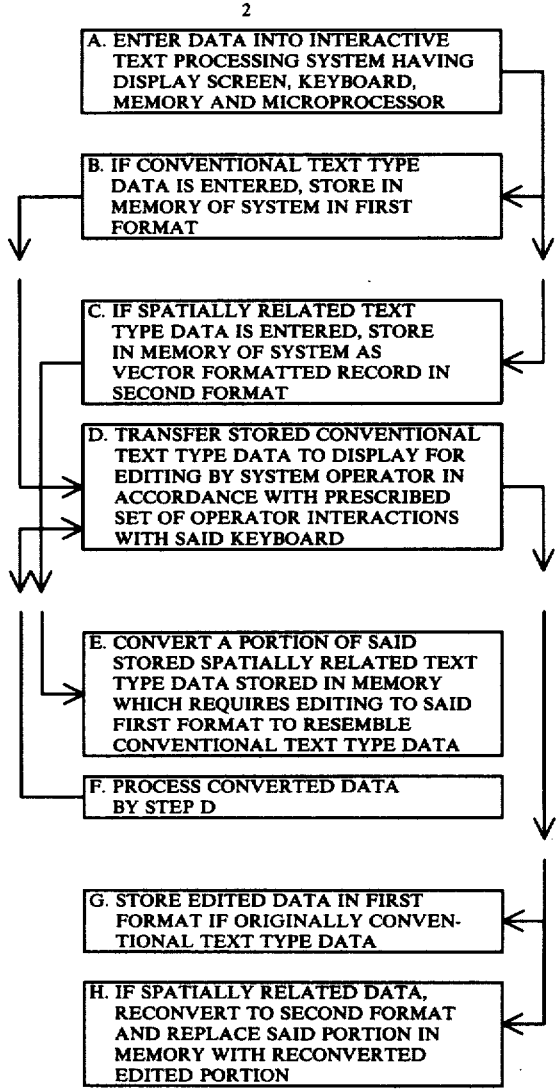

In practice, there is a finite number of specific editing procedures which are embodied in text processing systems. Those persons familiar with programming these systems, recognize the amount of programming involved in cursor control, that is, insuring that the spatial position of the cursor on the display screen is translated to the same precise contextual position in memory. Also, considerable programming is involved to interpret specific character keystrokes, control keystrokes, and cursor movement keystrokes to insure the proper system response in displaying the data and adjusting cursor position, both on the display screen and in memory.

Lastly, considerable programming is required during editing to insure that space is available in memory to store any data that is entered which involves moving data presently in the memory. Likewise, when data is deleted in an editing operation, its location in storage must be filled by moving the remaining data into the vacant area.

The advantages of using one process for editing both types of stored data, therefore, becomes readily apparent when the above factors are taken into consideration. The procedures required to decode the spatially related data to text data to permit editing are relatively simple and involve considerably less storage space than might be required for another set of editing programs which would be unique to vector stored data. The conversion process is also transparent to the operator and, hence, the operator is required to learn only one set of interactive steps to edit data, regardless of whether it is conventional text data or spatially related data. The chances of error, are, therefore reduced and processing efficiency is increased.

While the invention has been particularly described with reference to a preferred embodiment thereof, it will be understood by those skilled in the art that various other changes in the form and details may be made therein without departing from the spirit and scope of the invention.

Having thus described our invention, what we claim as new and desire to secure by Letters Patent is:

1. In a method of interactively editing text data displayed on a display screen of an interactive test processing system having a keyboard and a microprocessor including a memory for storing (1) programs; (2) conventional text data in one format; and (3) spatially related text type data in a second format, said spatially related text type data being stored in said memory in said second format as a plurality of vector formatted records to permit data processing type operations to be performed by said system on said records in either an interactive or non-interactive mode, said method including the step of displaying on said screen at least one line of text data stored in said system in said one format to permit the operator of said system to interactively edit said one line of displayed text data in accordance with a prescribed set of interactions of said operator with said screen and said keyboard, the improvement characterized by the steps of:
  (A) converting with said microprocessor at least one portion of one of said vector formatted records of spatially related text type data stored in said memory from said second format to said one format;
  (B) displaying to said operator said converted one portion on said display screen; and
  (C) editing said displayed converted one portion interactively by said prescribed set of operator interactions involving said operator, said keyboard and said display screen.

2. The method recited in claim 1 further characterized by the steps of:
  (A) reconverting with said microprocessor said edited displayed converted one portion from said one format to said second format; and
  (B) replacing said at least one portion of said record in said memory with said reconverted edited portion.

3. The method recited in claim 2 in which said editing by said prescribed set of operator interactions causes at least one character to be deleted from said displayed converted one portion.

4. The method recited in claim 2 in which said editing by said prescribed set of operator interactions causes at least one character to be inserted in said displayed converted one portion.

5. The method recited in claim 2 in which said editing by said prescribed set of operator interactions causes at least one character to be moved from one position to another position in said displayed converted one portion.

6. The method recited in claim 2 in which said second format comprises a row vector including a plurality of column vectors and where each said vector includes an indication of the number of byte positions in said vector and a relative spatial position in a predetermined coordinate system.

7. The method recited in claim 6 in which said number of byte positions in each said vector is variable.

8. The method recited in claim 7 in which said coordinate system is an X-Y coordinate system.

* * * * *

UNITED STATES PATENT AND TRADEMARK OFFICE
CERTIFICATE OF CORRECTION

PATENT NO. : 4,435,778
DATED : March 6, 1984
INVENTOR(S) : William C. Cason et al It is certified that error appears in the above-identified patent and that said Letters Patent are hereby corrected as shown below:

Column 12, line 20, "test" should read --text--.

Signed and Sealed this

Thirty-first Day of May, 1988

Attest:

DONALD J. QUIGG

Attesting Officer

Commissioner of Patents and Trademarks

(12) REEXAMINATION CERTIFICATE (4633rd)

United States Patent
Cason et al.

(10) Number: US 4,435,778 C1
(45) Certificate Issued: Sep. 3, 2002

(54) METHOD FOR EDITING SPATIALLY RELATED DATA IN AN INTERACTIVE TEXT PROCESSING SYSTEM

(75) Inventors: William C. Cason; Rex A. McCaskill, both of Austin; Francisco A. Karner, Round Rock, all of TX (US)

(73) Assignee: International Business Machines Corporation, Armonk, NY (US)

Reexamination Request:
No. 90/004,238, May 6, 1996

Reexamination Certificate for:
Patent No.: 4,435,778
Issued: Mar. 6, 1984
Appl. No.: 06/264,368
Filed: May 18, 1981

Certificate of Correction issued May 31, 1988.

(51) Int. Cl.[7] .......................... G06F 17/21; G06F 3/153
(52) U.S. Cl. ...................... 707/509; 345/124; 707/530; 707/531
(58) Field of Search ................... 395/766–771, 395/792, 793, 802, 601, 607; 345/123, 124, 141; 707/530, 531, 509

(56) References Cited

U.S. PATENT DOCUMENTS

| | | | |
|---|---|---|---|
| 3,248,705 A | 4/1966 | Dammann et al. | 395/792 |
| 3,312,948 A | 4/1967 | Capozzi | 395/800 |
| 3,403,391 A | 9/1968 | McCown | 345/1 |
| 3,422,420 A | 1/1969 | Clark | 345/26 |
| 3,610,902 A | 10/1971 | Hahenkamp et al. | 364/710.14 |
| 4,017,838 A | * 4/1977 | Breyer | 395/793 |
| 4,249,172 A | * 2/1981 | Watkins et al. | 345/123 |
| 4,334,286 A | * 6/1982 | Kerigan et al. | 395/770 |

FOREIGN PATENT DOCUMENTS

| | | |
|---|---|---|
| JP | 51-29046 | 3/1976 |

OTHER PUBLICATIONS

Gottfried, *Programming with FORTRAN IV*, Jan. 1972, pp. 35–49.*

Kernighan et al., The C Programming Language, Bell Laboratories, Inc., pp. 26, 27, 89–117, 119–141, 143–157, Jan. 1978.*

Ghezzi et al., Programming Language Concepts, pp. 10, 11, 113–121, Jan. 1982.*

Cooper et al., Oh! Pascal!, pp. 320–323, 389–433, Jan. 1982.*

Madnick, "String Processing Techniques", Comm. of the ACM, v. 10, n. 7, pp. 420–424, Jul. 1967.*

Gries, Compiler Construction for Digital Computers, p. 176, Jan. 1971.*

Elson, Data Structures, pp. 7–9, Jan. 1975.*

Coulouris et al., "The Design and Implementation of an Interactive Document Editor", Software—Practice and Experience, v. 6, pp. 271–279, Jan. 1976.*

Smith et al., "Designing the Star User Interface", Byte, v. 7, n. 4, pp. 242–280, Apr. 1982.*

Furuta et al., "Document Formatting Systems: Survey, Concepts, and Issues", ACM Computing Surveys, v. 14, n. 3, pp. 439–450, Sep. 1982.*

Chirlian, Simply VisiCalc, pp. 86–89, 95–99, Jan. 1984.*

Laurie, Computers and Computer Languages, pp. 242–244, Jan. 1966.*

IBM TDB, "System For Simplified Form Fill–In Using CRT Display", R. J. Gerlach et al., Apr. 1979, vol. 21, No. 11, pp. 4323–4329.

Petrocelli/Charter, First Edition, New York 1976, "Encyclopedia Of Computer Science", editor A. Ralston et al., pp. 1410–1418.

ACM, Sep., 1975, vol. 1–No. 1, "Proceedings of the International Conference on Very Large Data Bases", edited by, D. Kerr, Framingham, MA., Sep. 22–24, 1975, pp. 1–24.

Zloof et al., "The System for Business Automation (SBA): Programming Language", Comm. of ACM, v. 20, n. 6, Jun. 1977, pp. 385–396.

* cited by examiner

*Primary Examiner*—Joseph H. Feild

(57) ABSTRACT

An improved text processing method is disclosed which permits spatially related data to be displayed and edited by the same method employed to display and edit conventional text type data in an interactive text processing system which includes a keyboard, a display device, and a microprocessor.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–8, dependent on an amended claim, are determined to be patentable.

New claims 9, 10 and 11 are added and determined to be patentable.

1. In a method of interactively editing text data displayed on a display screen of an interactive text processing system having a keyboard and a microprocessor including a memory for storing (1) programs; (2) conventional text data in one format; and (3) spatially related text type data in a second format, said spatially related text type data being stored in said memory in said second format as a plurality of vector formatted records to permit data processing type operations to be performed by said system on said records in either an interactive or non-interactive mode, said method including the step of displaying on said screen at least one line of text data stored in said system in said one format to permit the operator of said system to interactively edit said one line of displayed text data in accordance with a prescribed set of interactions of said operator with said screen and said keyboard, the improvement [characterized by the steps of]:

wherein each of said records includes a unit of said spatially related text type data and relative spatial position information of said unit when displayed with respect to other units of said spatially related text type data;

and characterized by the steps of:

(A) converting with said microprocessor at least one [portion of one] *of said units* of said vector formatted records of spatially related text type data stored in said memory from said second format to said one format;

(B) displaying to said operator said converted one [portion] *of said units* on said display screen; and (C) editing said displayed converted one [portion] *of said units* interactively by said prescribed set of operator interactions involving said operator, said keyboard and said display screen.

*9. In a method of interactively editing text data displayed on a display screen of an interactive text processing system having a keyboard and a microprocessor including a memory for storing (1) programs; (2) conventional text data in one format; and (3) spatially related text type data in a second format, said spatially related text type data being stored in said memory in said second format as a plurality of vector formatted records to permit data processing type operations to be performed by said system on said records in either an interactive or non-interactive mode, said method including the step of displaying on said screen at least one line of text data stored in said system in said one format to permit the operator of said system to interactively edit said one line of displayed text data in accordance with a prescribed set of interactions of said operator with said screen and said keyboard, the improvement:*

*wherein each of said vector formatted records includes a unit of said spatially related text type data and relative spatial position information of said unit when displayed with respect to other units of said spatially related text type data;*

*and characterized by the steps of:*

*(A) editing a unit of said spatially related text type data in a selected one of said vector formatted records by changing said spatial position information in said selected record;*

*(B) converting with said microprocessor at least one of said units of text type data in one of said vector formatted records from said second format to said one format;*

*(C) displaying to said operator said converted one unit of text type data on said display screen; and*

*(D) text editing said displayed converted one unit of text type data interactively by said prescribed set of operator interactions involving said operator, said keyboard and said display screen.*

*10. A method of editing text data displayed on a display screen of a text processing system having a microprocessor including a memory for storing programs, conventional text data in a first format, and spatially related text data in a second format, comprising the steps of:*

*(A) storing said spatially related text data in said memory in said second format as one or more vector formatted records, wherein each of said records includes a unit of said spatially related text data and relative spatial position information of said unit of text when displayed with respect to other units of said spatially related text data;*

*(B) displaying one unit of spatially related text data from one of said vector formatted records in said memory, at a location on said display screen determined by relative spatial position information in said one vector formatted record;*

*(C) converting with said microprocessor, said one unit of spatially related text data from said one of said vector formatted records in said memory, by extracting said one unit of text from said one vector formatted record, forming a conventional text form of said one unit of text having said first format;*

*(D) displaying on said display screen said conventional text form of said one unit of text; and*

*(E) text editing with said microprocessor, a textual content of said conventional text form of said one unit of text.*

*11. A method of editing text data displayed on a display screen of a text processing system having a microprocessor including a memory for storing programs, conventional text data in a first format, and spatially related text data in a second format, comprising the steps of:*

*(A) storing said spatially related text data in said memory in said second format as one or more vector formatted records, wherein each of said records includes a unit of said spatially related text data and relative spatial position information of said unit of text when displayed with respect to other units of said spatially related text data;*

*(B) displaying one unit of spatially related text data from one of said vector formatted records in said memory, at* a location on said display screen determined by relative spatial position information in said one vector formatted record;

(C) editing with said microprocessor, said one unit of spatially related text data by changing said relative spatial position information in said one vector formatted record;

(D) converting with said microprocessor, said one unit of spatially related text data from said one of said vector formatted records in said memory, by extracting said one unit of text from said one vector formatted record, forming a conventional text form of said one unit of text having said first format;

(E) displaying on said display screen said conventional text form of said one unit of text; and (F) text editing with said microprocessor, a textual content of said conventional text form of said one unit of text.

\* \* \* \* \*